United States Patent [19]

Demeautis et al.

[11] Patent Number: 4,961,449
[45] Date of Patent: Oct. 9, 1990

[54] RESERVOIR CAP

[75] Inventors: Chantal Demeautis, Livry Gargan; Pascal Picot, Bonneuil Sur Marne, both of France

[73] Assignee: Bendix France, Drancy, France

[21] Appl. No.: 348,343

[22] Filed: May 5, 1989

[30] Foreign Application Priority Data

May 31, 1988 [FR] France ................ 88 07241

[51] Int. Cl.⁵ ............................................. B65B 1/04
[52] U.S. Cl. .................................... 141/348; 141/292; 141/295; 141/301; 141/346; 141/349; 137/543.19; 137/543.21; 215/315; 220/367
[58] Field of Search ............... 141/346, 347, 348, 349, 141/350, 351, 352, 353, 354, 291, 292, 293, 294, 295, 325, 326, 301, 302; 220/303, 85 R, 85 F, 367; 215/309, 315; 137/543.19, 543.21

[56] References Cited

U.S. PATENT DOCUMENTS

| | | | |
|---|---|---|---|
| 1,163,992 | 12/1915 | Ford | 141/326 X |
| 1,408,272 | 2/1922 | Daly | 141/351 X |
| 2,223,994 | 12/1940 | Johnson | 137/543.21 |
| 2,366,004 | 12/1944 | Crittenden | 137/543.19 X |
| 2,816,690 | 12/1957 | Lari | 141/351 X |
| 3,217,762 | 11/1965 | Burchett | 141/349 |
| 3,307,595 | 3/1967 | Berning et al. | 141/293 X |
| 3,373,776 | 3/1968 | Kajita | 141/292 X |
| 3,391,716 | 7/1968 | Projahn | 141/293 |
| 3,414,025 | 12/1968 | Smith | 141/348 |
| 3,476,507 | 11/1969 | Leeds | 141/348 |
| 3,521,999 | 7/1970 | Gauck | 141/348 |
| 3,624,755 | 11/1971 | Lambert | 141/293 |
| 3,763,902 | 10/1973 | Donahue | 141/349 |
| 3,765,447 | 10/1973 | Cornell | 137/543.21 X |
| 4,815,493 | 3/1989 | Miller et al. | 137/543.19 X |

FOREIGN PATENT DOCUMENTS

| | | | |
|---|---|---|---|
| 1124062 | 2/1962 | Fed. Rep. of Germany | 141/348 |
| 1249759 | 9/1967 | Fed. Rep. of Germany | . |
| 1368185 | 6/1964 | France | 141/348 |
| 1417200 | 10/1965 | France | 141/348 |
| 2055597 | 5/1971 | France | . |
| 84/01546 | 4/1984 | World Int. Prop. O. | . |

Primary Examiner—Ernest G. Cusick
Attorney, Agent, or Firm—Larry J. Palguta; Ken C. Decker

[57] ABSTRACT

The invention relates to a cap for a hydraulic fluid reservoir for a brake circuit of a vehicle. According to the invention, it has a filling aperture (24) intended to be closed by a valve member (38) through the action of a spring (36) mounted in the cap (10) in order to allow the reservoir to be filled on the assembly line without removing the cap. The valve member (38) is axially movable against the spring (36) which returns it in a closed position. The valve member (38) preferably has a seal.

1 Claim, 1 Drawing Sheet

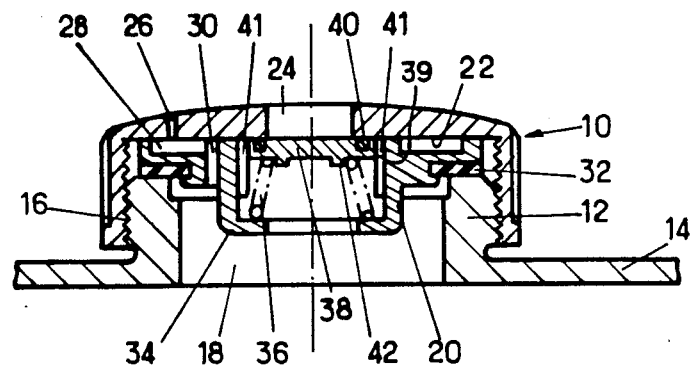
FIG:1
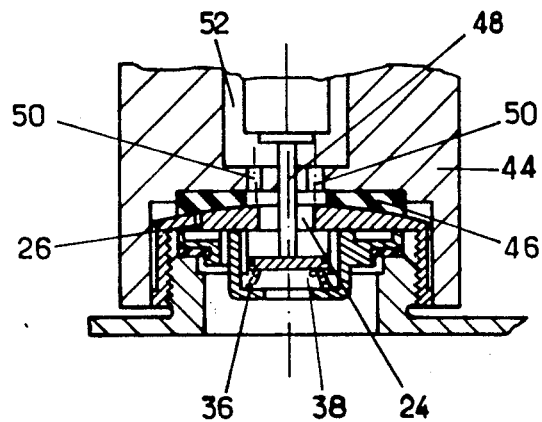
FIG:2

RESERVOIR CAP

BACKGROUND OF THE INVENTION

The present invention relates to reservoir caps, and, more particularly, to a cap for a fluid reservoir of a master cylinder associated with a brake circuit in a vehicle.

During the manufacture of a motor vehicle, the brake circuit is installed, exhausted and then filled with hydraulic fluid. As a general rule, these operations are handled through the master cylinder fluid reservoir and make it necessary for the reservoir cap first to be removed, the cap then being replaced on completion of the filling. This series of operations does not lend itself to the assembly line production of a motor vehicle, in which the operations are increasingly frequently carried out by machine. Moreover, motor vehicle manufactures wish to be able to effect the filling of the brake circuit in a simple, automated manner.

It is known from WO-A-84/01546 a connection system between a reservoir located on a vehicle and a container filled with the fluid, both recipients having complementary ends allowing a fluid-tight relationship with a foolproofing item avoiding the filling of the reservoir with a container different that the right one.

According to this document, the reservoir may include a spout extending outwardly, provided for entering an opening of the container and for depressing a cover, which allows the transference of the fluid from one to the other.

This invention is not concerned by a foolproofing item for avoiding undesirable mixture of liquids as the above mentioned document does, but it provides a cap for a reservoir of brake liquid, allowing a speedy filling without disassemblying, and comprising a vent passage, and valve means in the cap axis.

SUMMARY OF THE INVENTION

According to this invention, valve means comprises a valve member axially movable against a spring returning the valve member in closure position, by means of peripheral guide means provided within the cap.

This invention also relates to the corresponding filling head.

BRIEF DESCRIPTION OF THE DRAWINGS

Other characteristics and advantages of the present invention will emerge from the following description of one embodiment indicated as an example, this description being given with reference to the accompanying drawing, in which:

FIG. 1 is a view in longitudinal section of a reservoir cap according to the invention; and FIG. 2 is a similar view of the cap shown in FIG. 1 during the filling of the reservoir.

DETAILED DESCRIPTION OF THE INVENTION

As shown in FIG. 1, a reservoir cap 10 is mounted on an annular wall 12 of a reservoir 14 by means of a screwthread 16, the annular wall defining a filling aperture or opening 18 in the reservoir 14. The cap 10 has an inner part 20 which is substantially annular and which is mounted stationary on the inner surface 22 of the cap 10. The cap has a filling aperture 24 which is substantially circular and an opening 26 which leads to an air passage 28 in communication with the interior of the reservoir 14. The air passage 28 is normally open in order to avoid any difference of pressure between the inside and outside of the reservoir and is offset from the axis of the opening 18. The air passage 28 is advantageously provided with a baffle means 30 in order to prevent a leakage of the hydraulic fluid from the vehicle on which the reservoir is installed is jolted. A fluid seal between the cap 10 and the annular wall 12 is achieved by means of an annular seal 32 of elastomer material. The inner part 20 has an annular edge 34 on which is mounted one end of a spring 36. The other end of the spring 36 bears against the bottom surface of a valve member 38 which is substantially circular and whose diameter is larger than that of the filling aperture 24. The valve member 38 is provided with an annular seal 40 adjoining its periphery. In order to ensure that the valve member 38 will remain coaxial with the filling aperture 24, the inner part 20 is provided with spaced ribs 41 which engage value member recesses 39. The end of the spring 36 is centered on the bottom surface of the valve member 38 by means of an annular stop 42. In the position of rest shown in FIG. 1, the filling aperture 24 is closed by the valve member 38 through the action of the spring 36. Leaktightness is ensured by the annular seal 40.

The reservoir supplies, for instance, the hydraulic fluid of a hydraulic brake circuit. Car manufacturers first exhaust the brake circuit in order to eliminate air and gas within the circuit, then fill the brake circuit with the hydraulic fluid, and finally fill the corresponding reservoir.

FIG. 2 shows the reservoir cap 10 during the filling of the brake circuit with hydraulic fluid. A filling head 44 is disposed around the reservoir cap 10 and is provided with an annular seal 46 ensuring leak-tightness between the two and in addition closing the opening 26 in order to allow the evacuation of the brake circuit. The filling head 44 has a thrust rod 48 disposed coaxially with the valve member 38 and having a length such that when the filling head 44 is placed in position around the reservoir cap 10, said rod moves the valve member 38 against the action of the spring 36 and thus opens the filling aperture 24. The filling head 44 is provided with openings 50 communicating with a fluid passage 52 leading to a vacuum source and to a source of fluid under pressure (not shown). When the filling head 44 is in position on the reservoir cap 10, the brake circuit is evacuated. Then a predetermined amount of hydraulic fluid is delivered through the passage 52 and the filling aperture 24 to the interior of he reservoir 14. When filling has been completed, the filling head 44 is withdrawn and the valve member 38 closes the filling aperture 24 through the action of the spring 36.

The filling of the reservoir during assembly line production of the vehicle is thus made simple and easy by the reservoir cap according to the present invention. The reservoir cap also makes it possible for the owner to add hydraulic fluid easily when that is necessary, making use of a can of fluid on which the closure member comprises the essential components, namely the seal and the thrust rod, of the filling head. It is obviously still possible to fill the reservoir by simply unscrewing the reservoir cap.

Instead of the cap being mounted on the reservoir by means of a screwthread, it is possible to provide for it to be mounted by a snap-on connection or to be made in one piece with the reservoir.

It is also possible for the filling head 44 to be incorporated in a hydraulic fluid container.

We claim:

1. In combination, a cap adapted for an annular filling opening of a reservoir of brake fluid connected to the brake circuit of a vehicle and a filling head adapted for evacuating and filling said brake circuit with said brake fluid, said opening having an axis, said cap comprising an air passage normally open to atmosphere and offset from said axis, the passage including baffle means for preventing escape of brake fluid, and located on said axis a filling cap aperture bounded by an adjacent inner part of the cap, the adjacent inner part including ribs, and valve means allowing an evacuation of said brake circuit and a speedy filling of the circuit with said brake fluid during assembly line production of said vehicle, said valve means including a valve member movable axially against a spring biasing said valve member to normally close said filling cap aperture, the valve member having complementary shaped recesses receiving the ribs, said evacuation and filling being completed by means of the filling head which is provided with a thrust rod for opening said valve member and with an annular seal for closing said air passage during the evacuation and filling.

* * * * *